United States Patent [19]
Frenkel et al.

[11] 3,811,520
[45] May 21, 1974

[54] TOOL FOR DRILLING HOLES AND CUTTING SLOTS

[76] Inventors: Shiman Tevelievich Frenkel, p/o Agudzera, 28, kv. 4, Sukhumi; Gely Fomich Skripko, ulitsa Vyshgorodskaya, 33, kv. 13, Kiev; Georg Froimovich Golub, ulitsa Dorogozhitskaya, 28, kv. 87, Kiev; Evgeny Leonidovich Prudnikov, ulitsa Stetsenko 1, kv. 55, Kiev; Naum Borisovich Ganelin, ulitsa Dorogozhitskaya, 24, kv. 61, Kiev, all of U.S.S.R.

[22] Filed: Apr. 24, 1972

[21] Appl. No.: 246,798

[30] Foreign Application Priority Data
Apr. 24, 1971 U.S.S.R............................ 1646212

[52] U.S. Cl.................. 175/398, 175/404, 175/410
[51] Int. Cl............................................. E21b 9/16
[58] Field of Search....... 175/404, 410, 398; 125/20

[56] References Cited
UNITED STATES PATENTS
2,088,197   7/1937   Gairoand............................ 175/398

FOREIGN PATENTS OR APPLICATIONS
246,284   5/1970   U.S.S.R................................ 125/20

Primary Examiner—Harold D. Whitehead
Attorney, Agent, or Firm—Holman & Stern

[57] ABSTRACT

A tool is disclosed wherein provision is made for a shank and a cutting portion of which the latter is made of an abrasive-containing material. A stem is positioned in the side of the cutting portion along the tool generant which is made of a material less resistant to abrading and having a higher bending strength than the material of the cutting portion, the profile of the stem being identical to the profile of a longitudinal slot in the end surface of the cutting portion.

3 Claims, 5 Drawing Figures

PATENTED MAY 21 1974

3,811,520

TOOL FOR DRILLING HOLES AND CUTTING SLOTS

BACKGROUND OF THE INVENTION

The present invention relates generally to tools and more particularly it relates to the tools for drilling holes and cutting slots, the tools being made of an abrasive-containing material.

The invention can be realized most efficiently when the tools are employed to drill holes, preferably small ones, and also when the tools are used to drill blind holes having a flat bottom, for cutting slots particularly in a hard and friable material such as glass, Sital, granite and the like.

Known in the art are tools for drilling holes and cutting slots, the tools consisting of a shank and a cutting portion affixed thereto, which is made of an abrasive-containing material (such as a material containing diamond granules bound by a metal binder) and possessing a longitudinal slot which is so arranged that abrasive particles found on the end surface of said cutting portion are located at a certain distance away from the tool rotational axis, while the bottom of said slot is given a convex curvilinear surface which is instrumental in shearing off or abrading a core being formed during the process of drilling. (cf., e.g., USSR Author's certificate No. 246,284, Cl. 49a, 60/02).

Proceeding from the fact that the linear speed at the axis of rotation is equal to zero, abrasive particles located at said axis will be unable to perform any cutting process. Therefore, the location of these particles at a certain distance away from the axis of rotation permitted by the presence of the longitudinal slot on the cutting portion of the tool will impart to said abrasive particles a necessary speed of motion to perform the cutting process.

With prior-art tools, as such tools become worn on the end face thereof and due to the curvilinear shape of the slot bottom, the profile on the slot is changed until the moment comes when the abrasive particles on the end face are found at the axis of rotation of the tool. When in this position, the cutting speed of the particles is equal to zero and, as a result, no cutting takes place and the drilling process discontinues.

In order to reduce reduce the frequency of regrinding the longitudinal slot, the slot should be made self-sharpening. In the tool of the prior art this is not possible since the core formed during the cutting process of the material being treated, resting against the curvilinear bottom of the slot made in the abrasive material of the cutting portion of the tool, is unable to abrade the slot to the required degree due to a high wearing resistance set up by the abrasive-containing material.

Also in the prior-art tool the cutting portion made fully of an abrasive-containing material is not relatively strong and in order to avoid its breakage during the process of cutting, the work must be done with low applied axial thrust which reduces the tool production capacity.

Making a slot in the abrasive-containing material, especially in diamond-containing material, is a difficult task and requires application of specific processes, such as electric-spark process, which are low-productive as a rule.

SUMMARY OF THE INVENTION

It is a principal object of the present invention to provide an improved cutting portion of the tool.

It is a further object of the present invention to improve the productive capacity of the tool.

It is a still further object of the present invention to improve the tool operating conditions.

These and other objects are achieved due to the provision of a tool for drilling holes and cutting slots, made of an abrasive-containing material and possessing a longitudinal slot which is so arranged that abrasive particles found on the end surface of said cutting portion are located at a certain distance away from the tool rotation axis, while the bottom of said slot is given a convex curvilinear surface which is instrumental in shearing off or abrading a core being formed during the process of drilling, wherein, according to the invention, the cutting portion includes a stem which is arranged in the side of and affixed to said portion along the tool generant and made of a material substantially less resistant to abrading and of higher bending strength than the material of the cutting portion, wherein the profile of the stem is identical to the profile of the longitudinal slot made in the end surface of the cutting portion and the longitudinal slot is made in said stem.

Provision of the longitudinal slot in the stem made of the material which is less wear-resistant than the abrasive-containing material of the cutting portion ensures more itensive wear of the bottom of said slot and consequently a certain self-sharpening effect of the tool caused during drilling by the core resting on the bottom of the slot. Apart from that, the fact that the stem affixed to the tool cutting portion is made of the material possessing a higher bending strength improves the general strength of the tool to make possible higher cutting parameters, i.e., higher tool operating capacity.

In the herein-disclosed tool, the provision of the stem made of the material which is less wear-resistant than the abrasive-containing material facilitates the manufacture of the slot as a conventional cutoff grinding wheel which can be employed for the purpose.

The identity of the stem profile with the profile of the longitudinal slot in the end surface of the cutting portion assists in that during wear-on of the cutting portion across the end face in the course of drilling, the profile of the slot remains substantially permanent due to a more intensive wear of the material which the stem is made of.

It is expedient to make the stem an integral part of the shank of the tool. This will improve the general strength of the tool and simplify its manufacture as there is no need in this case to effect interconnection of the two parts and to ensure the necessary firmness of the interconnection.

It is likewise expedient to ensure that the end face of the stem will not protrude beyond the end surface of the cutting portion and be positioned at a certain distance away from this surface. This will lead to a more durable effect of the core upon the stem due to which the stem will be wearing more intensively and the number of the required regrindings of the tool will be reduced.

BRIEF DESCRIPTION OF THE DRAWINGS

In order that the invention may be more clearly understood some specific embodiments will now be described with reference to the accompanying drawings, in which.

DETAILED DESCRIPTION OF THE PREFERRED EMBODIMENT

Figure 1:
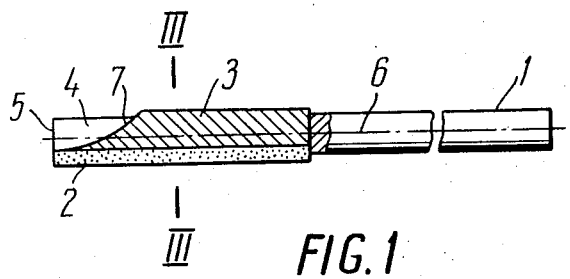
FIG. 1 is a front, partially sectional, view of a tool constructed according to the present invention.

The tool comprises a shank 1 (FIG. 1) and a cutting portion 2 connected thereto and made of an abrasive-containing material. The cutting portion 2 carries a stem 3 affixed in the side of said portion along the tool generant which is made of a material which is less resistant to abrading and has a higher bending strength than the material of the cutting portion.

The abrasive-containing material consists of diamond granules bound by a metal binder. The material of the stem may be, for instance, a metal binder used for binding diamond granules. Also bronze, steel, and the like may be used.

The selection of the stem material according to its wear-resistant properties is dictated by the self-sharpening conditions of the tool, while the tool strength properties are those required by the strength of the tool as a whole.

Figures 2, 3:
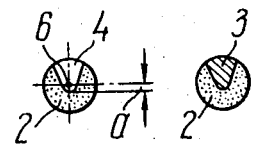
FIG. 2 is a side view of a structure shown in FIG. 1
FIG. 3 is a section taken along the line III—III of FIG. 1.

The stem 3 incorporates a longitudinal slot 4 and the profile of the stem 3 is identical to the profile of the slot 4 on the end surface 5 of the cutting portion 2, as can be seen from FIGS. 2 and 3.

The longitudinal slot 4 is so arranged that abrasive particles are on the end surface 5 of the cutting portion 2 at a certain distance "$a$" (FIG. 2) from the tool rotation axis 6, while the bottom 7 of said slot is given a convex curvilinear surface which is instrumental in shearing off or abrading a core being formed during the process of drilling.

Figure 4:
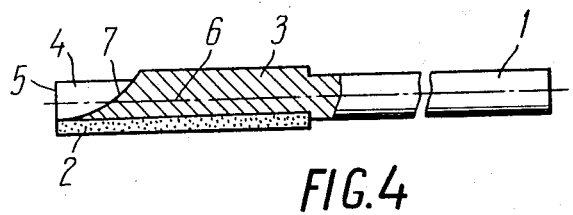
FIGS. 4 and 5 are front views of other embodiments constructed according to the present invention.

To ensure a stronger interconnection of the stem 3 and the cutting portion 2 with the shank 1 the stem is made an integral part of the shank as shown in FIG. 4.

Figure 5:
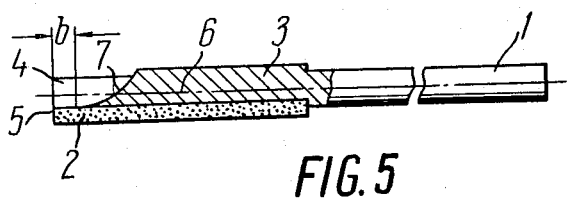

To provide for a more intensive wear of the stem 3 by a core being formed during the process of drilling, which is necessary to ensure the self-sharpening of the tool, the end face of the stem on the side of the longitudinal slot 4 does not protrude beyond the end surface 5 of the cutting portion 2 and is positioned at a certain distance "$b$" (FIG. 5) away from this surface.

The drilling process occurs as follows:

During rotation of the tool, due to the positioning of abrasive particles on the end surface 5 of the tool at a certain distance "$a$" from the axis of rotation 6, the particles possess a definite speed of motion in relation to the material being treated thus permitting the drilling process to be put into effect.

A remaining small pillar or core left at the center of the hole being drilled, rests against the curvilinear surface of the bottom 7 and is either abraded or sheared off by said surface and the surface itself is worn on the bottom of the slot in the tool. The lower the wear resistance properties of the material of the stem on which the core rests and the higher the abrading properties of the material being treated, the more intensive the stem will wear. With the proper selection of the stem material and the cutting parameters, the effect of full self-sharpening of the tool can be obtained.

What we claim is:

1. A tool for drilling holes and cutting slots, said tool comprising: a shank for mounting the tool in a holder; a cutting portion connected to said shank which is made of an abrasive-containing material; a stem positioned in the side of said cutting portion along the tool generant connected to said portion, said stem being made of a material which is less resistant to abrading and having a higher bending strength than the material of the cutting portion; said stem having a longitudinal slot therein with the stem profile being identical to the profile of said longitudinal slot; and wherein said longitudinal slot is so arranged that abrasive particles on the end surface of said cutting portion are positioned at a certain distance from the axis of rotation of the tool in order to impart a required cutting speed to said particles, and wherein the bottom of said slot has a convex curvilinear surface which is instrumental in shearing off or abrading a core being formed during the process of drilling.

2. A tool as claimed in claim 1, wherein said stem is made an integral part of the shank.

3. A tool as claimed in claim 1, wherein the end face of said stem on the side of the longitudinal slot does not protrude beyond said end surface of the cutting portion and is located at a given distance from said end surface of the cutting portion.

* * * * *